United States Patent [19]

Karger et al.

[11] 4,448,744
[45] May 15, 1984

[54] METHOD OF LOADING AND/OR UNLOADING A NUCLEAR REACTOR, AND SUPPORT MEMBER, ESPECIALLY FOR THE FOREGOING METHOD

[75] Inventors: Ludwig Karger, Frankfurt; Hans-Joachim Lippert, Erlangen, both of Fed. Rep. of Germany

[73] Assignee: Kraftwerk Union Aktiengesellschaft, Mulheim an der Ruhr, Fed. Rep. of Germany

[21] Appl. No.: 285,577

[22] Filed: Jul. 21, 1981

[30] Foreign Application Priority Data

Jul. 21, 1980 [DE] Fed. Rep. of Germany ....... 3027562
Nov. 26, 1980 [DE] Fed. Rep. of Germany ....... 3044570

[51] Int. Cl.³ .............................................. G21C 3/30
[52] U.S. Cl. .................................... 376/262; 376/264; 376/448
[58] Field of Search ....................... 376/448, 262, 264

[56] References Cited

U.S. PATENT DOCUMENTS

| 3,920,517 | 11/1975 | Sasaki et al. | 376/448 |
| 4,038,133 | 7/1977 | Bittermann et al. | 376/448 |
| 4,067,772 | 1/1978 | Kim | 376/448 |
| 4,076,586 | 2/1978 | Bideau et al. | 376/448 |
| 4,304,635 | 12/1981 | Lippert et al. | 376/448 |

FOREIGN PATENT DOCUMENTS 50102567 3/1977 Japan .................................. 376/448

Primary Examiner—Sal Cangialosi
Attorney, Agent, or Firm—Herbert L. Lerner; Laurence A. Greenberg

[57] ABSTRACT

Method of loading or unloading or both loading and unloading a nuclear reactor, wherein control rods of cruciform cross section are at least partly withdrawn, each of the control rods being associated with a respective group of four fuel assemblies respectively having elongated duct tubes of rectangular cross section and being disposed in respective corners of a rectangular mesh of a transverse support grid, the duct tubes forming therebetween a gap-shaped intermediate space of cruciform cross section for accommodating a respective one of the control rods of cruciform cross section, which includes, prior to withdrawing a respective control rod associated with the respective group of four fuel assemblies, unloading from the nuclear reactor at least one of the four fuel assemblies of the group thereof, and inserting a support member into the respective mesh so as to fix in the respective corners of the mesh the ends of two diagonally opposed fuel assemblies of the group remaining in the nuclear reactor; and support member for use in the foregoing method.

21 Claims, 7 Drawing Figures

METHOD OF LOADING AND/OR UNLOADING A NUCLEAR REACTOR, AND SUPPORT MEMBER, ESPECIALLY FOR THE FOREGOING METHOD

The invention relates to a method of loading and/or unloading a nuclear reactor wherein control rods of cruciform cross section, are withdrawn, and especially completely withdrawn from the nuclear reactor, each control rod being associated with a group of fuel assemblies disposed in the nuclear reactor and having elongated duct tubes of rectangular, and especially square cross section, each group being formed of four fuel assemblies respectively disposed in one corner of a rectangular, and especially square, mesh of a transverse support grid or lattice the duct tubes thereof defining therebetween a gap-shaped interspace for accommodating a control rod and likewise having a cruciform cross section. The invention also relates to a support member for the foregoing method.

This method according to the invention is of particular importance for boiling-water nuclear reactors wherein each square mesh of a transverse surface grid or lattice, the so-called upper core support grid or plate, formed of webs standing on edge and intersecting at right angles, unites a group of four fuel assemblies, forming a so-called core cell. Disposed in the intermediate space between the duct tubes of these four fuel assemblies is the control rod of cruciform cross section displaceable in longitudinal direction thereof. Both the fuel assemblies with the elongated duct tubes thereof as well as the control rod are disposed vertically in the boiling-water nuclear reactor. The drive for the control rod is located at the bottom of the pressure vessel of the boiling-water nuclear reactor, wherein the fuel assemblies with the control rods associated therewith are located also, so that these control rods are each driven from below, respectively, between the four fuel assemblies forming the one core cell.

Proper functioning of the nuclear power plant and, especially, the nuclear reactor must be checked constantly. It is quite necessary, especially, to check the insertion time of the control rods into the core cells and, thus, the proper functioning of the control rod drives. This is not only required when initially loading the boiling-water nuclear reactor with fuel assemblies, but also when in-service inspections are performed, to which the nuclear power plant, and especially the nuclear reactor, are subjected in a given cycle after the startup thereof. The measuring of the insertion time of the control rods into the core cells, however, presupposes a preceding total withdrawal or retraction of the control rods from the core cells.

The reactor core containing the fuel assemblies is always so constructed, however, that excess reactivity is provided which is compensated, or even overcompensated, by the neutron-absorbing control rods. A consequence of a total withdrawal or retraction of the control rods from the core cells of the fully loaded reactor core, therefore, is that the nuclear reactor becomes not only critical, but also supercritical and that a growing, uncontrolled chain reaction sets in, leading to the destruction of the reactor core.

Therefore, in order to measure the insertion time of the control rods into the reactor core, only two dummy fuel assemblies, respectively, were placed in the meshes of the upper core support grid or lattice with which a control rod is associated, before the initial loading of the reactor core so that the dummies were disposed in the mesh in two diagonally opposed corners. These dummy fuel assemblies contain no nuclear fuel, but have an external construction which is exactly like or similar to fuel assemblies containing nuclear fuel. Even before they are placed into the mesh of the upper core support grid or lattice, the ends thereof whereat the handles for the gripper of a loading machine are located are mutually connected by a rigid cross member extending in two mutually aligned diagonals of the duct tubes of both dummy fuel assemblies. In the mesh of the core support grid or lattice, these two dummy fuel assemblies ensure proper guidance of the control rod associated with this mesh when it is inserted into the reactor core and, consequently, into the respective core support grid mesh. Since all of the control rods of the nuclear reactor must be inserted simultaneously into the reactor core to measure the insertion time thereof, each core lattice mesh with which a control rods is associated has to be equipped with two such dummy fuel assemblies, prior to the initial loading, for guiding the respective control rod. The initial loading of the reactor core with regular or normal fuel assemblies containing nuclear fuel then occurs with inserted control rods, in that two regular fuel assemblies are inserted initially into the two free corners of the core support grid or lattice meshes already equipped with the two dummy fuel assemblies. The two dummy fuel assemblies are then unloaded and replaced by two additional regular fuel assemblies in the core support grid or lattice meshes. In this manner, the initial loading of the nuclear reactor with regular fuel assemblies is carried out with fully inserted control rods which are alsays mechanically guided in the individual core support grid meshes, thereby preventing the nuclear reactor from becoming critical during the initial loading.

The initial loading of the nuclear reactor, therefore, requires practically half as many dummy fuel assemblies as the reactor core contains fuel assemblies after loading. Since a dummy fuel assembly is also relatively costly, the builder of the nuclear reactor and of the nuclear power plant, respectively, makes available the set of dummy fuel assemblies required for the initial loading of the nuclear reactor. But, after the initial loading, this set does not remain in the nuclear power plant, but rather, is reclaimed by the nuclear reactor manufacturer or builder to be reused for the initial loading of other nuclear power plants. In particular, the set is no longer available to the nuclear power plant operator for measuring the control rod insertion time when in-service inspections are scheduled after the startup of the nuclear power plant. Also, dummy fuel assemblies used in such in-service inspections would be contaminated in the nuclear reactor and could be decontaminated after unloading from the nuclear reactor only at considerable expense.

It is accordingly an object of the invention to provide such a method and a support member for use therein which remedy this situation and considerably reduce the number of dummy fuel assemblies required for the initial loading of the nuclear reactor to check the proper functioning of the nuclear installation, especially of the control rod drives, and to avoid entirely for in-service inspections after the startup of the nuclear reactor, the use of dummy fuel assemblies which would only be contaminated in the nuclear reactor anyway.

With the foregoing and other objects in view, there is provided, in accordance with the invention, a method of loading or unloading or both loading and unloading a nuclear reactor wherein control rods of cruciform cross section are at least partly withdrawn, each of the control rods being associated with a respective group of four fuel assemblies respectively having elongated duct tubes of rectangular cross section and being disposed in respective corners of a rectangular mesh of a transverse support grid, the duct tubes forming therebetween a gap-shaped intermediate space of cruciform cross section for accommodating a respective one of the control rods of cruciform cross section, which comprises, prior to withdrawing a respective control rod associated with the respective group of four fuel assemblies, unloading from the nuclear reactor at least one of the four fuel assemblies of the group thereof, and inserting a support member into the respective mesh so as to fix in the respective corners of the mesh the ends of two diagonally opposed fuel assemblies of the group remaining in the nuclear reactor.

In accordance with another mode of the invention, the method includes placing the support member on two handles engageable by the gripper of a loading machine, each of the handles being attached to a respective one of the two fuel assemblies.

In accordance with a further mode of the invention, the method includes guiding the two fuel assemblies along edges of the respective duct tubes thereof disposed opposite one another in direction of the mesh diagonal by means of a device associated with the support member.

In accordance with an added mode of the method invention, wherein the support member is rigid and, prior to the withdrawal of the respective control rod, two of the fuel assemblies of the group thereof are unloaded from the nuclear reactor, the method includes guiding the two fuel assemblies remaining in the nuclear reactor along edges of the respective duct tubes thereof disposed opposite one another in direction of one of the mesh diagonals by means of a device associated with the support member, and placing the support member on webs of the transverse support grid, likewise prior to withdrawing the control rod, the support member being disposed in the other of the mesh diagonals and, with centering members, engaging respective corners of the mesh lying in the other mesh diagonal.

In accordance with an additional mode of the invention, the method includes gripping, by means of a gripper of a loading machine, a handle attached to the support member.

Assurance is provided by this method according to the invention that maximally half of the fuel assemblies provided in the reactor core are unloaded from this reactor core if the control rods are withdrawn or retracted from the reactor core, and especially totally withdrawn therefrom. The number of unloaded fuel assemblies can be selected so that the fuel assemblies remaining in the reactor core after the withdrawal of the control rods in no case forms a critical mass any longer, so that it is impossible for the nuclear reactor to become critical after the control rods have been withdrawn.

On the other hand, after the withdrawal of the control rod, the support member inserted into each mesh of the transverse support grid or lattice and fixing or locking in this mesh two diagonally opposed fuel assemblies in their two mesh corners, prevents the fuel assemblies remaining in the mesh from assuming an oblique or inclined position and jamming the control rod when the latter is reinserted.

In accordance with another aspect of the invention, there is provided a support member for use in the method of the invention, comprising a rigid web having at respective ends thereof a respective centering box formed with a centering hole for receiving therein a respective handle of one of the two fuel assemblies. Such a support member makes use of the fact that, at the upper end of the fuel assembly, handles are provided for the gripper of a loading machine, this support member being disposable on top of the handles.

In accordance with another feature of the support member, the respective centering holes of the centering boxes are formed as elongated slots disposed transversely to the web.

In accordance with a further feature of the support member, there is provided a rigid web having attached at respective ends thereof a respective centering part for engaging in a mesh of the transverse support grid, and having formed at the ends thereof respective bearing surfaces associated with the transverse support grid.

In accordance with an added feature of the invention, the support member includes a device for guiding the two fuel assemblies along edges of the respective duct tubes thereof disposed opposite one another in direction of the mesh diagonal, the guiding device comprising rails disposed on the rigid web between the two centering boxes and forming, with the centering holes of the centering boxes, similarly directed guide channels for the edges of the duct tubes and for spring elements located thereat, respectively.

In accordance with an additional feature of the invention, the support member includes a device for guiding the two fuel assemblies along edges of the respective duct tubes thereof disposed opposite one another in direction of the mesh diagonal, the guiding device comprising rails disposed on the rigid web between the two centering parts and forming, with the centering holes of the centering parts, similarly directed guide channels for the edges of the duct tubes and for spring elements located thereat, respectively.

In accordance with yet another feature of the invention, the support member includes a handle accommodated to a gripper of a loading machine and located between the two centering boxes on the web.

In accordance with yet a further feature of the invention, the support member includes a handle accommodated to a gripper of a loading machine and located between the two centering parts on the web.

In accordance with yet an added feature of the invention, the support member includes a supporting part secured laterally to the web for laterally supporting a respective duct tube of one of the fuel assemblies.

In accordance with yet an additional feature of the invention, the support member includes flat crosspieces located at the ends of the web and forming bearing surfaces associated with the transverse support grid.

In accordance with another feature of the support member, one of the flat crosspieces has a square contour with a diagonal thereof aligned with the web, and located at one end of the web, and the other of the flat crosspieces is strip-shaped, extends flatly and transversely to the web and is located at the other end of the web, spaced therefrom.

In accordance with another embodiment of the support member according to the invention, each of the centering holes merges into respective mutually parallel guide sleeves aligned with the centering holes and open at both ends thereof, and including a respective supporting pin loosely guided in each of the guide sleeves and in the respective centering holes associated therewith, each of the supporting pins having an end facing away from the respective centering hole associated therewith and supporting a respective different end of a balance beam mounted on the rigid web between the mutually parallel guide sleeves, the balance beam being pivotable about an axis of rotation disposed perpendicularly to a plane defined by the longitudinal directions of the guide sleeves and the supporting pins, respectively.

The length of the supporting pins, on the one hand, and the position of the axis of rotation on the balance beam can be adjusted or matched to one another so that when the support member is placed upon the two fuel-assembly handles, the supporting pin always deposit themselves on the upper edges of the handles of both fuel assemblies in the centering holes of the centering boxes due to an equalizing or balancing turn of the balance beam about the axis of rotation thereof, regardless of the amount of difference in length between the two fuel assemblies within given limits. This is also why the guide sleeves on the centering boxes of the support member will automatically be aligned with the fuel assembly handles in the centering holes of the centering boxes, so as to prevent canting or jamming of these handles in the centering holes, which are parallel to one another and to the guide sleeves. Moreover, the tool with which the support member is placed upon the fuel assemblies e.g. the gripper of the fuel-assembly loading machine, can be relieved of weight or counterweighted for the placement operation to the point that it can be disengaged, the weight of the support member being transmitted to the fuel assembly handles via the web, the balance beam and the supporting pins.

In accordance with another feature of the support member, the supporting pins have hemispherically rounded ends projecting out of the guide sleeves and facing away from the respective centering holes, the supporting pins loosely supporting the balance beam.

In accordance with a further feature of the invention, the support member includes a respective collar formed on the supporting pins between the location thereof, on which the balancing beam is supported and the respective guide sleeve associated with the supporting pins, respectively, the collar having a diameter greater than the inner diameter of the respective guide sleeve.

In accordance with a further feature of the invention, the supporting pins are of equal length, and the axis of rotation of the equalizing beam is located in the middle between the two guide sleeves. In this case it is advantageous and in accordance with a concommitant feature of the invention that the equalizing beam be straight.

In accordance with a further embodiment of the invention, the support member which is especially suited for the method according to the invention has a rigid web with a centering part, for engaging in a mesh of the transverse support grid or lattice, the centering part being disposed at each web end respectively, and formed at both web ends with seating surfaces coordinated or associated with the transverse support grid or lattice. If only two fuel assemblies disposed in one mesh diagonal remain in the respective mesh of the transverse support grid or lattice, the appropriate seating surfaces of this support member in the other and transverse mesh diagonal can be placed upon the transverse support grid or lattice and centered by means of the centering parts thereof, the two fuel assemblies remaining in the mesh being fixed or locked in the mesh corners opposite one another.

Other features which are considered as characteristic for the invention are set forth in the appended claims.

Although the invention is illustrated and described herein as embodied in method of loading and/or unloading a nuclear reactor and support member, especially for the foregoing method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
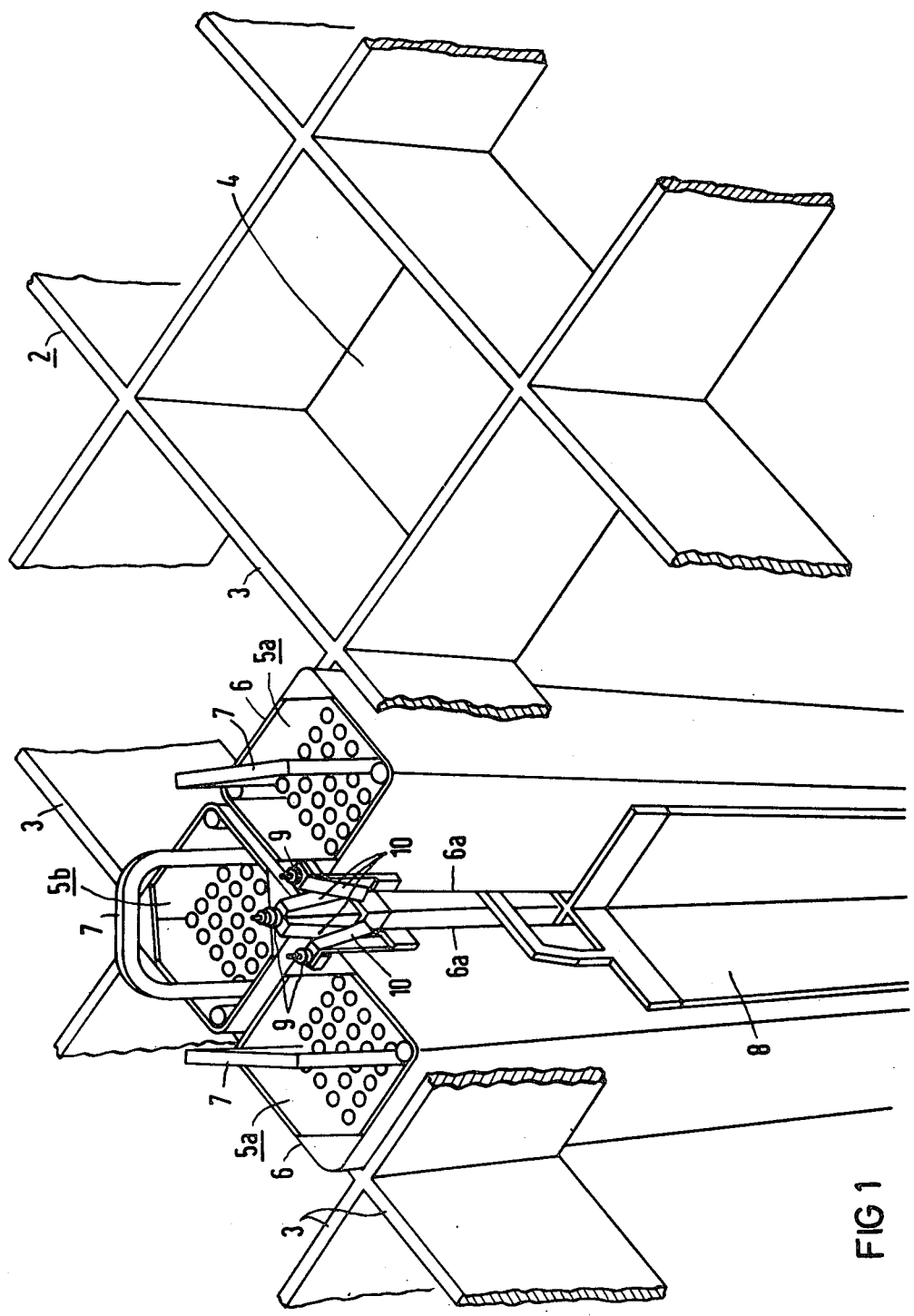
FIG. 1 is a fragmentary perpective view of a transverse grid, the so-called upper core support plate or grid of a boiling-water nuclear reactor.

Referring now to the drawing and first, particularly to FIG. 1 thereof, there is shown a transverse support grid 2 made up or edgewise oriented webs 3 forming square meshes 4. This transverse grid 2 is disposed horizontally in the core of a boiling-water nuclear reactor and is there designated as the upper core support grid.

A mesh 4 of the transverse grid 2, respectively, encloses four vertically disposed fuel assemblies 5a and 5b, only three of which are shown in FIG. 1, and of which each has an elongated duct tube 6 of square cross section. Each of the fuel assemblies 5a and 5b, is disposed in a respective corner of the respective mesh 4 so that the duct tubes 6 of these fuel assemblies form a gap-like interspace of cruciform cross section wherein an elongated control rod 8, also of cruciform cross section, is disposed so as to be movable in vertical direction.

At the upper opening of the duct tubes 6 of the fuel assemblies 5a and 5b, a spring element 9 is provided in the respective corners of the fuel assembly duct tube 6 which are located in the center of the mesh 4. Each spring element 9, at both sides of the respective duct tube 6, which meet at the corner where this spring element 9 is fastened, has a respective leaf spring 10 which, with only one end thereof fastened to this spring element 9, is oriented in longitudinal direction of the respective duct tube 6, the other end of the respective leaf spring 10 being spaced from the respective side of the duct tube 6. All of the spring elements 9 of the fuel assemblies 5a and 5b are of identical construction so that the free ends of the leaf springs 10 mutually engage under pretensioning at two mutually opposing sides of two fuel assemblies 5a and 5b. In this way the leaf springs 10 of the spring elements 9 fix the fuel assemblies 5a and 5b in their corners of the mesh 4.

At the upper ends of the fuel assemblies 5a and 5b, at which the spring elements also are located, there is further disposed a respective yoke-type handle 7 for the gripper of a fuel-assembly loading machine. This handle 7 lies, respectively, in the diagonal of the upper opening of the duct tube 6 opposite the corner at which the respective spring element 9 is fastened. The handles 7 of two fuel assemblies 5a or 5b located in a respective diagonal of a respective mesh 4 respectively lies in two mutually parallel planes.

The lower non-illustrated ends of the fuel assemblies 5a and 5b rest loosely but centered on an also non-illustrated common head member through which the control rod 8 also shiftably extends. The head member, in turn, is mounted in a centering hole of a non-illustrated plate, the so-called core lattice or support grid or plate, which rests on a likewise non-illustrated horizontally disposed transverse lattice, corresponding to the transverse grid 2, the so-called lower core lattice or support plate or grid.

Testing of the functioning or operation of the control rod drives including measuring of the injection time of the control rods at a first loading of a boiler-water nuclear reactor with a reactor core according to FIG. 1 can then be prepared and performed as follows:

A mesh 4 is initially loaded with two fuel assemblies 5b, located diagonally opposite one another in the mesh 4. For greater clarity, only one of these fuel assemblies 5b is shown in FIG. 1. The aforementioned two fuel assemblies 5b with which the mesh 4 is initially loaded contain no nuclear fuel; thus, dummy fuel assemblies are involved which are mutually connected at the yoke-type handles 7 by a cross member likewise non-illustrated in FIG. 1. The mesh 4 is then loaded with the two other fuel assemblies 5a which contain nuclear fuel. Then, the control rod 8 is driven into the slot between the duct tubes 6 of the fuel assemblies 5a and 5b.

The control rod 8 is thereby guided by the duct tubes 6 of the fuel assemblies 5a and 5b which are locked in the four corners of the mesh 4 by the spring elements 9. The control rod 8 may also be driven initially between the duct tubes 6 of the dummy fuel assemblies 5b, and then the mesh 4 is loaded with the other two fuel assemblies 5a containing nuclear fuel. The dummy fuel assemblies 5b are then unloaded from the mesh 4. They remain available for loading other meshes 4 in the same manner. Finally, the two nuclear fuel-containing fuel assemblies 5a remaining in the mesh 4 and being mutually adjacent in a mesh diagonal are locked in the diagonally opposed mesh corners thereof by inserting into the mesh 4 a support member 21 according to FIGS. 2 and 3, or a support member 41 according to FIGS. 4 and 5, or a support member 61 according to FIGS. 6 and 7. The support members 21, 61 and 41 are located in the respective mesh 4 in one of the mesh diagonals thereof, the support members 21 and 61 in the diagonal wherein the fuel assemblies 5a are also located, the support member 41 in the diagonal counter or opposite thereto. By using the dummy fuel assemblies 5b unloaded from previously loaded meshes 4, all meshes 4 of the transverse or upper core lattice 2 can be loaded in the same manner successively with two diagonally opposed fuel assembly pairs 5a containing nuclear fuel, and these fuel assembly pairs 5a can be locked in the mesh corners thereof by a support member 21 or 41.

Since two of the fuel nuclear fuel-containing fuel assemblies 5a normally provided in each mesh 4 are missing therefrom, the thus-loaded core of the boiling-water nuclear reactor does not have critical mass. Therefore, the control rods 8 can be withdrawn completely downwardly from all meshes 4 of the transverse grid or lattice 2 without reservation and subsequently be reinserted into the meshes 4 from below to measure the insertion time. There is no danger of the control rods 8 jamming with the fuel assemblies 5a remaining in the meshes 4 because these fuel assemblies 5a are locked in the mesh corners by the support members 21 or 41 and therefore cannot assume an oblique or inclined position.

Upon the conclusion of the measuring of the insertion time of the control rods 8, the support members 21 or 41 can again be removed from the meshes 4 by means of the fuel assembly loading machine while the control rods 8 are fully inserted, for example, deposited at the edge of a spent fuel pit or storage pool for irradiated fuel assemblies. Then, also the empty spaces in the meshes 4 are loaded with fuel assemblies 5b which, this time, contain nuclear fuel, while the control rods 8 are fully inserted.

In this method of initially loading the boiling-water nuclear reactor, only a few dummy fuel assemblies are required which can be re-used over and over again for successively loading the individual meshes 4 with fuel assemblies 5a containing nuclear fuel.

Figure 6:
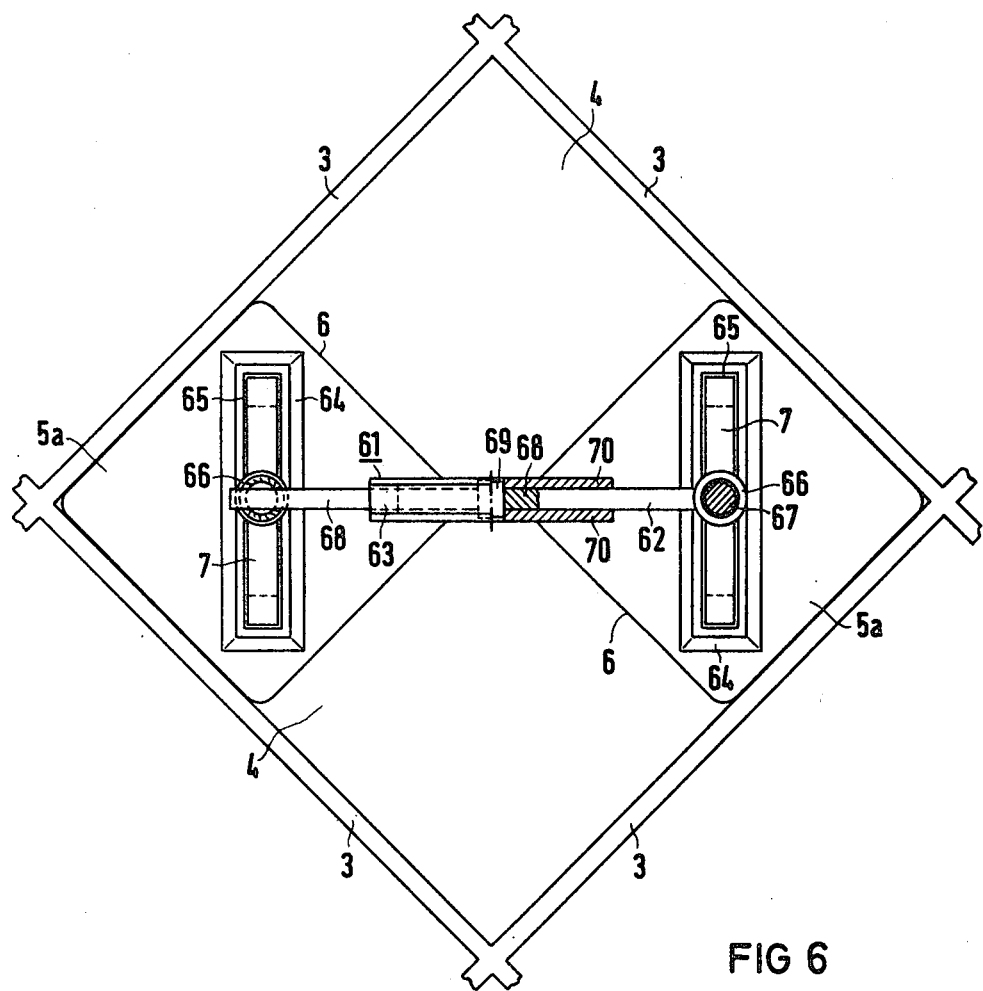
FIG. 6 is a top plan view of a mesh of the transverse grid with a third embodiment of the support member according to the invention inserted therein.
Figure 7:
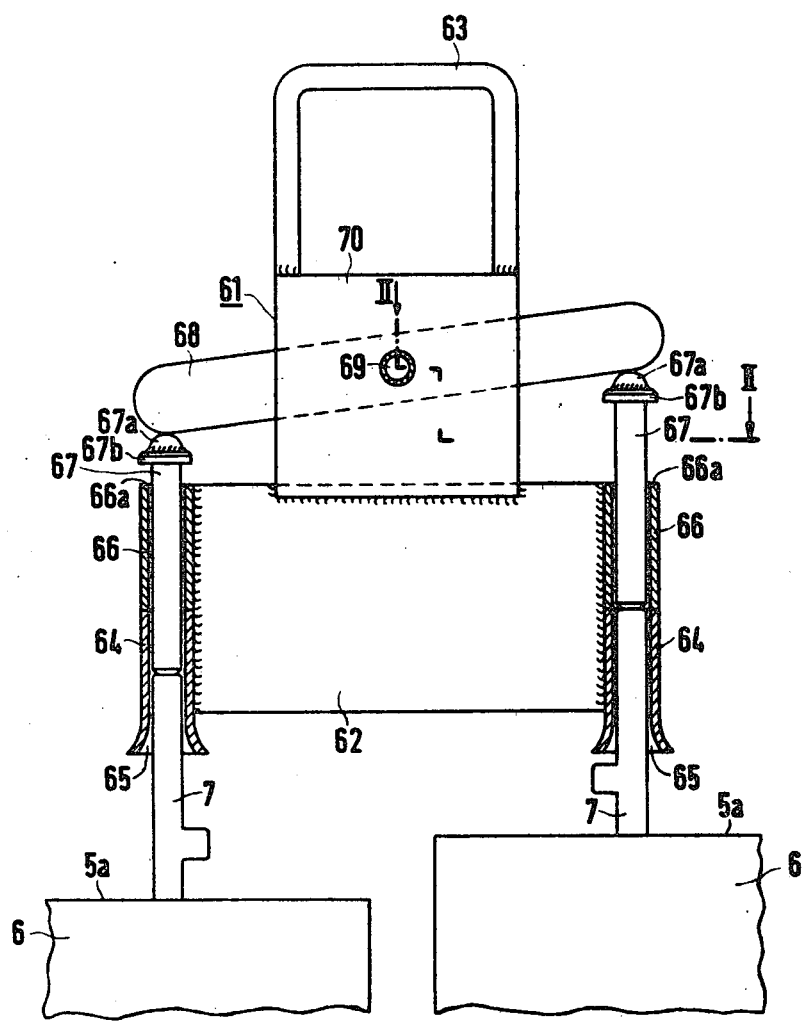
FIG. 7 is an elevational view, partly in section, of the support member according to FIG. 6 as seen in direction of a diagonal of the mesh extending from the bottom to the top thereof.

A check of the proper functioning of the control rod drives, by measuring the control-rod insertion time, when an in-service inspection is made after the boiling-water nuclear reactor has been placed into operation, is carried out as follows:

In each mesh 4 according to FIG. 1, there are four irradiated fuel assemblies 5a and 5b containing nuclear fuel. Furthermore, the control rod 8 is fully inserted into the mesh 4. At least one, but usually both fuel assemblies, such as the fuel assemblies 5b, for example, disposed opposite one another in a mesh diagonal, are successively unloaded from the meshes 4 by the gripper of a fuel assembly loading machine and deposited in a spent fuel pit for irradiated fuel assemblies. Then a support member, such as the support member 21 according to FIGS. 2 and 3, or the support member 41 according to FIGS. 4 and 5, or the support member 61 according to FIGS. 6 and 7, is inserted into each mesh 4 to lock into the mesh corners the irradiated fuel assemblies 5a remaining in the respective meshes 4 and disposed in a mesh diagonal.

Because, in this case, also, the critical mass of the reactor core is not attained, because of the one or two fuel assemblies missing from each mesh 4, the control rods 8 can now be retracted or withdrawn completely, without risk, and then all of them can be reinserted or scrammed simultaneously into the meshes 4 of the reactor core to measure the insertion time. Thereafter, the fuel assemblies 5b originally removed from the meshes 4 can be re-inserted or reintroduced into the meshes 4 with the gripper of the loading machine while the control rods 8 are fully inserted. It is also possible to reload new, nonirradiated fuel assemblies 5b containing nuclear fuel instead of the irradiated fuel assemblies 5b. Thereafter, the reactor is re-started by appropriate partial retraction or withdrawal of the control rods 8. To perform this procedure or method, no dummy fuel assemblies need be used at all.

Because neither a fuel assembly nor a dummy fuel assembly is involved with the support member per se, the method according to the invention is applicable, in advantageous manner, no matter, respectively, whether the four fuel assemblies 5a and 5b in the individual meshes 4 of the transverse or upper core grid or lattice 2 are all or only partly dummies and whether they all or only in part are irradiated or nonirradiated, regular or normal assemblies containing nuclear fuel.

Figure 2:
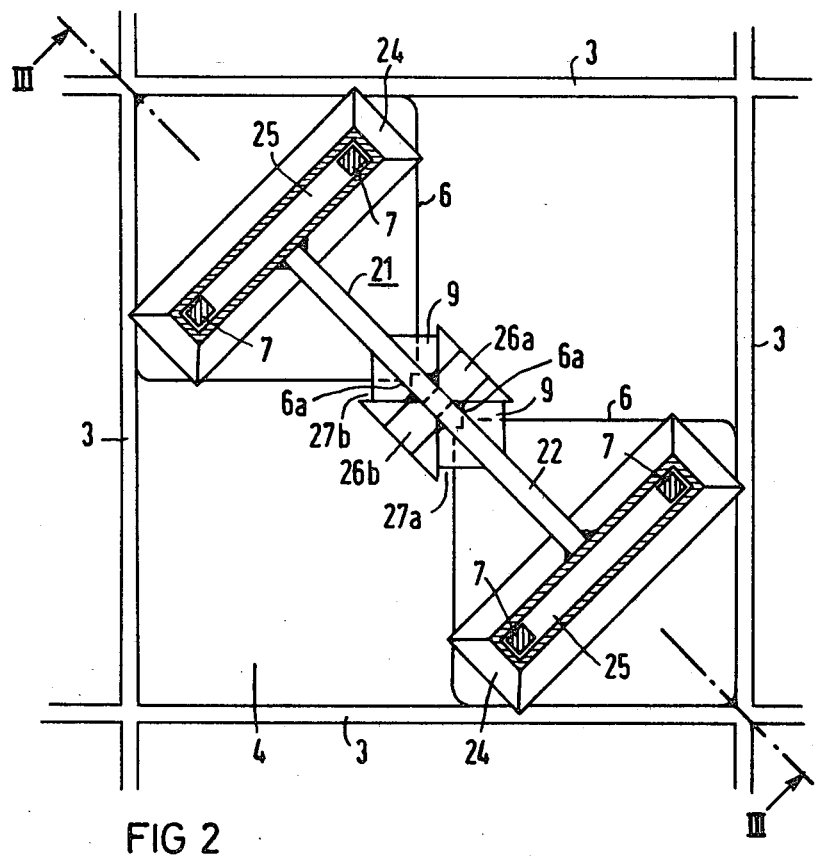
FIG. 2 is a top plan view, partly in section, of a mesh of the transverse grid of FIG. 1 with a support member inserted therein.
Figure 3:
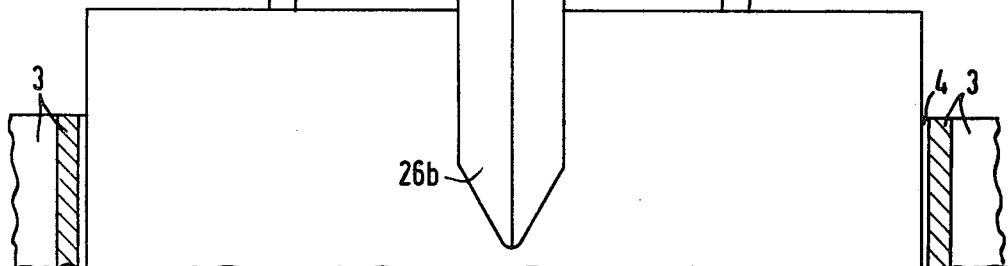
FIG. 3 is a slightly enlarged sectional view of FIG. 2 taken along the line III—III in direction of the arrows.

According to FIGS. 2 and 3, a support member 21 advantageous for the method according to the invention has a web 22 formed of a strip-shaped steel part. Welded to one elongated edge thereof is a handle 23, advantageously accommodated to the gripper of a loading machine intended for the fuel assemblies 5a and 5b, handles 7 at the ends of the fuel assemblies 5a and 5b being also accommodated to the loading-machine gripper. The handle 23 is located on an edge 21 of the web 22 between two centering boxes 24, of which each is welded to a respective end of the web 22 at the other elongated edge thereof. Each of these centering boxes 24 has an opening in the form of an elongated vertical slot 25, thus being disposed transversely to the web 22. This slot 25 is provided to accommodate therein the handles 7 at the upper ends of two fuel assemblies, such as the fuel assemblies 5a, for example, disposed in a diagonal of a mesh 4. Advantageously, these handles 7 lie in two mutually parallel planes, have the same dimensions and fit, largely free of any play, within the slots 25.

There is also mounted, in an advantageous manner, on the same elongated edge of the web 22 as that on which the centering boxes 24 are located, and in the middle between these centering boxes 24, a device to guide the edges 6a of the duct tubes 6, which are mutually opposed in the mesh diagonal of those fuel assemblies 5a, on the handles 7 of which, the support member 21 is surmounted with the slots 25 in the centering boxes 24 thereof.

This device for guiding the fuel assemblies 5a along the duct tube edges thereof has two rails 26a and 26b having a cross section, respectively, which is a right isosceles triangle. Each of these rails 26a and 26b, respectively, is welded at one end thereof to the two sides of the web 22, and at the other free end thereof is pointed. Both of the rails 26a and 26b are perpendicular to the elongated edges of the web 22. The two elongated edges of the web 22 at which the right angles of the triangular cross sections of the rails 26a and 26b are disposed are located opposite one another in such a manner that the sides thereof between which the right angles of the cross-sectional triangle are disposed, respectively form a guide channel 27a and 27b of rectangular cross section and perpendicular to the two elongated edges of the web 22. Each of the guide channels 27a and 27b is disposed opposite a different centering box 24. They extend in the same direction as the centering openings of the centering boxes 24 formed of the slots 25 and are earmarked to receive a respective one of the mutually opposed elongated edges 6a of the duct tubes 6 of the fuel assemblies 5a disposed in a mesh diagonal, on the handles 7 of which the support member 21 is seated. Advantageously, the dimensions of the guide channels 27a and 27b are such that the leaf springs 10 of the spring elements 9, are located at the opposite edges of the duct tubes 6 of these fuel assemblies 5a, are supported or braced under mechanical preloading or prestressing in the guide channels 27a and 27b at the sides of the rails 26a and 26b. The device formed of the rails 26a and 26b for guiding the fuel assemblies 5a, thereby performs an elastic centering action when these fuel assemblies 5a are locked in their corners of the respective mesh 4.

After unloading the fuel assemblies 5b by means of the fuel assembly loading machines at the gripper of which the handle 23 hangs, the support member 21 according to FIGS. 2 and 3 is inserted into the respective mesh 4 by disposing it on the handles 7 of the remaining fuel assemblies 5a.

The rails 26a and 26b thereby engage in the corner spaces of the mesh 4 originally associated with the fuel assemblies 5b and guide the mutually opposed elongated edges of the duct tubes 6 of the fuel assemblies 5a remaining in the mesh 4 under mechanical preloading of the leaf springs 10 of the spring elements 9 mounted on both sides of these edges. The centering boxes 24 thereby perform, by means of the handles 7 and the rails 26a and 26b of the guiding device for the elongated edges of the duct tubes 6, a centering action upon the fuel assemblies 5a locked in the mesh corners thereof.

If a guiding device with rails 26a and 26b is omitted from the middle of the web 22 of the support member 21, this support member 21 can even be placed upon the handles 7 of the fuel assemblies 5a before the fuel assemblies 5b are unloaded, provided that the centering boxes 24 be of such construction that they do not interfere with unloading of the fuel assemblies 5b.

Figure 4:
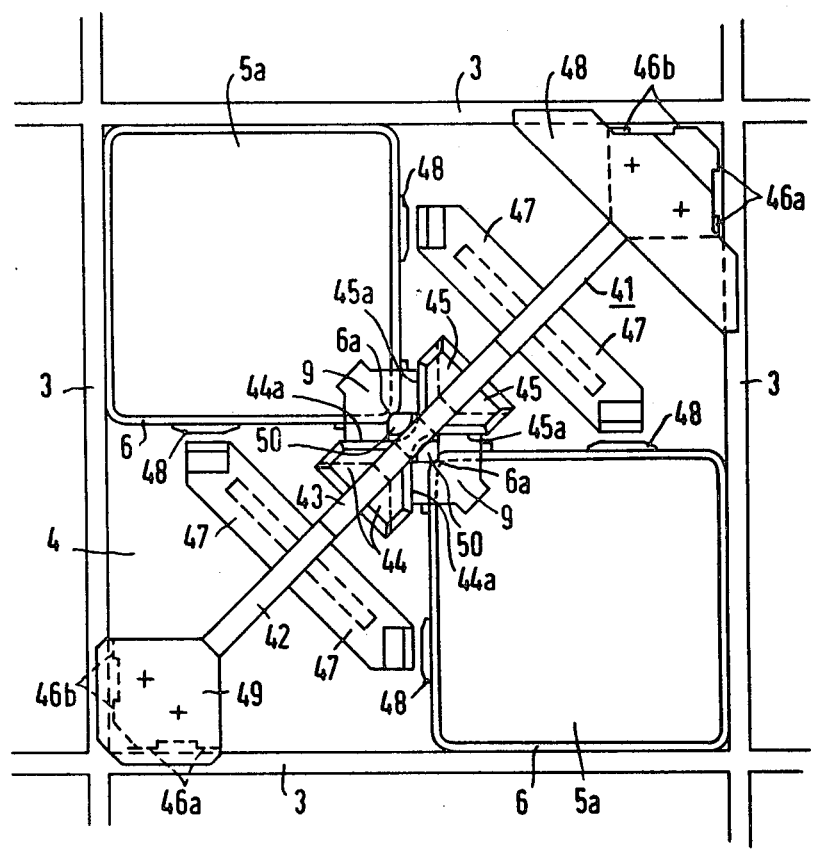
FIG. 4 is a top plan view of a mesh of the transverse grid with another embodiment of the support member, according to the invention, inserted therein.
Figure 5:
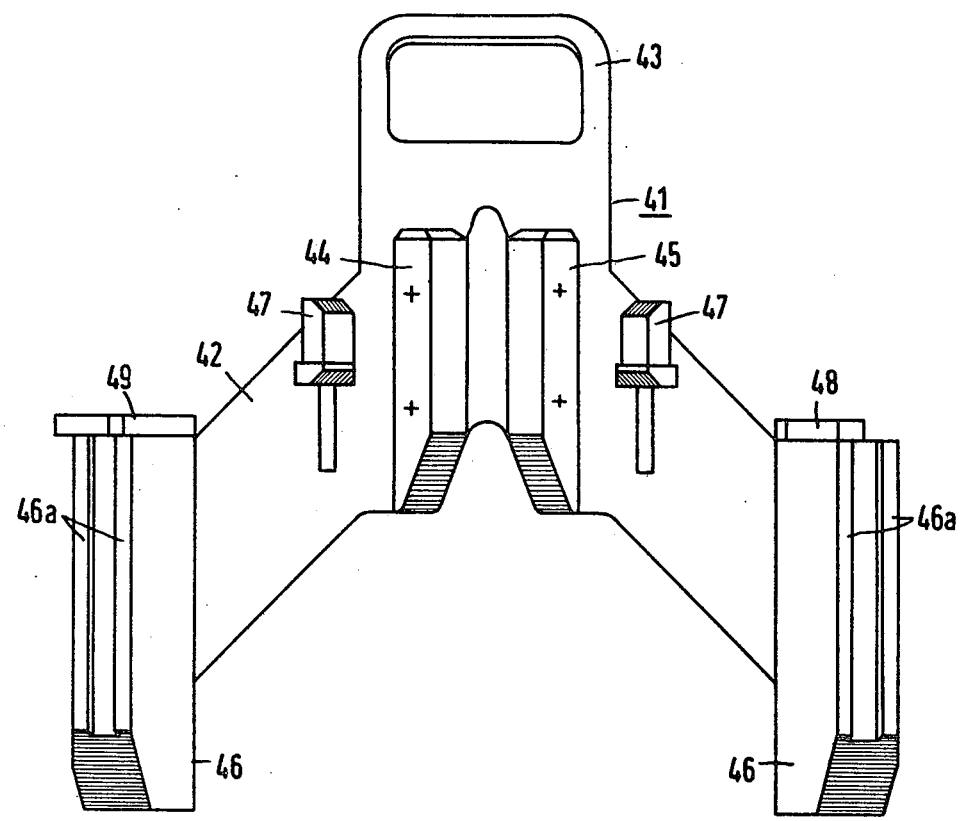
FIG. 5 is an elevational view, partly in section, of the support member according to FIG. 4 as seen in the direction of a diagonal of the mesh extending from the lower right-hand corner to the upper left-hand corner thereof.

Whereas a support member 21 according to FIGS. 2 and 3 is especially suited for carrying out the method according to the invention when a nuclear reactor is initially loaded, a support member 41 according to FIGS. 4 and 5 is especially suited for performing the method according to the invention after the respective nuclear reactor has been started up.

The support member 41 according to FIGS. 4 and 5 likewise has a rigid web 42 formed of sheet steel, to the ends of which, respectively, an elongated centering member 46 is screwed. In longitudinal direction thereof, these two centering parts 46 are disposed parallel to one another, and both of them are located on the same side of the connecting line between points at which they are fastened to the web 42, to which they are perpendicular. Disposed on the other side of this connecting line, in the middle between the centering parts 42, is a handle 43 which is accommodated to the gripper of a loading machine for the fuel assemblies 5a and 5b.

Furthermore, screwed to both sides of the web 42 in the middle between the centering paths 46 are two elongated rails 44 and 45 having a longitudinal direction which parallels the longitudinal direction of the centering parts 46. These rails 44 and 45 have a trapezoidal cross section. One side surface 44a and 45b each of these rails 44 and 45 and the flat side of the web 42 to which the respective rail 44 and 45 is screwed form an angle of 45°. On each side of the web 42, these side surfaces 44a and 45a of the thereat fastened two rails 44 and 45, respectively, are located opposite one another and form a guide channel 50 of rectangular cross section for the edge 6a of the duct tube 6 of one of the two fuel assemblies 5a diagonally disposed in the mesh 4. The guide channels 50 and the centering members 46 extend in the same direction.

In addition, attached to the same two sides of the web 42 to which the rails 44 and 45 are also fastened, are supporting members 47 disposed perpendicularly to the sides of web 43 and, respectively, between the group of rails 44 and 45, on the one hand, and the centering parts 46, on the other hand.

After unloading the diagonally opposed fuel assemblies 5b in a mesh 4 according to FIG. 1, a support member 41 according to FIGS. 4 and 5 is inserted into this mesh 4 in the diagonal of these unloaded fuel assemblies 5b or in the diagonal counter to or opposing the fuel elements 5a remaining in the mesh 4 before the control rod 8 is retracted or withdrawn. The centering members 46 thereby engage the mesh 4 at both ends of the web 42, the side surfaces 46a and 46b thereof resting there against the inner sides of the webs 3. Flat crosspieces 48 and 49 attached to the web ends form bearing surfaces on the support member 41 for bearing against the webs 3 of the transverse support grid of lattice 2. Advantageously, the flat crosspiece 49 has a square outline, and is attached flatly to the one web end with the web 42 aligned with the diagonal thereof. The other crosspiece 48 is stripshaped and attached flatly and transversely to the web 42 at the other web end, spaced from the latter. The stripshaped crosspiece 48 is inclined at both ends thereof towards the web and to which it is attached. Assurance is thereby provided that the crosspieces of two support members 41 adjacent to an intersection of the web 3 of the transverse grid support plate or lattice 2 match one another and can lie flush on or make full contact with the webs 3.

After the insertion of the support member 41 into the mesh 4 and after the flat crosspieces 48 and 49 thereof have been placed upon the webs 3 of the transverse support grid or lattice 2, mutually opposed elongated edges of the duct tubes 6 of the two fuel assemblies 5a remaining in the mesh 4, with the elongated tongues or leaves 10 of the spring elements 9 mounted thereat, are respectively located in the guide channels 50 formed by the rails 44 and 45. The leaf springs 10 of the spring elements 9 engage the side surfaces 44a and 45a of the rails 44 and 45 under mechanical preloading or prestressing so that the fuel assemblies 5a are locked in their corners of mesh 4.

The supporting members 47 have bearing surfaces located opposite and with a slight spacing from stops or contact heads 48 provided laterally on the duct tubes 6 of the fuel assemblies 5a. These supporting members 47 act as lateral stops for the duct tubes 6 of the fuel assemblies 5a when vibrations of the reactor core occur, and prevent movements which could destroy the leaf springs 10 of the spring elements 9.

The support member 41 is placed upon the webs 3 of the transverse support grid or lattice 2. It is seated there independently of the length of the fuel assemblies 5a remaining in the mesh 4, which length can vary from the original length, especially after the nuclear reactor has been in operation for a very long period of time. A support member 41 according to FIGS. 4 and 5 is especially advantageous for the method according to the invention, for example, during an in-service inspection with measurement of the insertion time of the control rods 8 which is performed after start-up of the nuclear reactor.

The support member 61 according to FIGS. 6 and 7 has a web 62 of a strip-shaped steel part. Welded to one of the elongated edges thereof is a handle 63 which is advantageously accommodated or matched to the gripper of a loading machine provided for the fuel assemblies 5a and 5b, and to which the handles 7 at the ends of the fuel assemblies 5a and 5b are also accommodated or matched. This handle 63 is located on the web 62 between two centering boxes 64, each of which is welded to one end of web 62 at the other elongated edge of the latter. Each of these centering boxes 64 has, on the same side of the support member 61, a centering hole 54 in the form of a long slot disposed perpendicularly i.e. transversely, to the web 62. These slot-shaped centering holes 65 are provided for accommodating therein, the handles 7 at the upper ends of two fuel assemblies 5a, for example, disposed in a diagonal of a respective mesh 4. These handles 7 advantageously lie in two mutually parallel planes, have the same dimensions and, largely, fit into the mutually parallel, slot-shaped centering holes 65 free of play i.e. without clearance.

The centering holes 65 of the two centering boxes 64, formed by slots, merge into a respective flush or aligned guide sleeve 66 which is open at both ends thereof. Like the centering holes 65, these guide sleeves 66 are parallel to one another and located opposite the end of the centering hole 65 provided for the handles 7. An elongated supporting pin 67 extends loosely displaceable in longitudinal direction within each of the guide sleeves 66. Both supporting pins 67 are of equal length and project out of the respective guide sleeve 66 at the end 66a of the latter which faces away from the slot-shaped centering holes 65. As FIG. 7 shows, these supporting pins 67 are also guided loosely in the slot-shaped centering holes 65 of the centering boxes 64 and, therefore, can also be shifted in longitudinal direction thereof within these centering holes 65.

As FIG. 7 shows further, the ends 67a of the supporting pins 67 projecting out of the sleeve ends 66a are hemispherically rounded. These hemispherically rounded ends 67a are respectively disposed in loose contact with another end of a balance beam 68 extending transversely to the longitudinal direction thereof and are supported thereat in longitudinal direction. This balance beam 68 is advantageously rectilinear and pivotal about a pivot pin 69. This pivot pin 69 and, accordingly, the axis of rotation of the equalizing beam 68 are perpendicular to the plane defined by the longitudinal directions of the two guide sleeves 66 and the supporting pins 67, respectively.

This pivot pin 69 is fastened to two plates 70, to which it is perpendicular, and which are welded on a respective side thereof and on the edge of the web 62 with the handle 63. The handle 63, in turn, is welded to the edges of the plates 70 opposite the weld edges. It is between these two plates 70 that the balance beam 68 pivots about the pivot pin 69, which is located in the middle between the two guide sleeves 66, and consequently pivots about an axis of rotation likewise located in the middle between the guide sleeves 66.

Advantageously, the supporting pins 67, between the bearing points thereof on the balance beam 68 i.e. between the hemispherically rounded end 67a and the guide sleeve 66, have a respective collar 67b projecting beyond the inner cross section of the respectively associated guide sleeve 66, thereby preventing the supporting pins 67 from falling, due to gravity, out of the guide sleeves 66 through the centering holes 65 when the support member 61 is raised.

The support member 61 according to FIGS. 6 and 7 may be placed upon the handles 7 of the fuel assemblies 5a either before or even after unloading the fuel assemblies 5b by means of the fuel assembly loading machine, from the gripper of which the handle 63 is suspended, the fuel assemblies 5a being disposed opposite one another diagonally in the respective mesh 4, and being supposed to remain in this mesh 4. Due to the weight of the support member 61, the handle 7 of the somewhat longer of the two fuel assemblies 5a thereby forces the supporting pin 67 associated therewith upwardly in the longitudinal direction thereof in the respective guide sleeve. This causes the balance beam 68 to be swung upwardly about the bearing point of the other supporting pin 67 associated with the shorter of the two fuel assemblies 5a, thereby lifting the web 62 with the guide sleeves 66 and the centering boxes 64 upwardly so that the centering holes 65 and the sleeves 66 are always parallel to and in alignment with the handles 7 and the supporting pins 67 so that neither these handles 7 can tilt or jam in the centering holes 65 nor the supporting pins 67 in the guide sleeves 66.

The support member 61 may be of completely symmetrical construction and can, therefore, be used in advantageous manner to lock the fuel assemblies 5a when turned 180° or to lock the fuel assemblies 5b in the mesh according to FIG. 1 when turned 90°.

There are claimed:

1. Method of loading or unloading or both loading and unloading a nuclear reactor wherein control rods of cruciform cross section are at least partly withdrawn, each of the control rods being associated with a respective group of four fuel assemblies respectively having elongated duct tubes of rectangular cross section and being disposed in respective corners of a rectangular mesh of a transverse support grid, the duct tubes forming therebetween a gap-shaped intermediate space of cruciform cross section for accommodating a respective one of the control rods of cruciform cross section, which comprises, prior to withdrawing a respective control rod associated with the respective group of four fuel assemblies, unloading from the nuclear reactor at least one of the four fuel assemblies of the group thereof, and inserting a support member into the respective mesh so as to fix in the respective corners of the mesh the ends of two diagonally opposed fuel assemblies of the group remaining in the nuclear reactor.

2. Method according to claim 1 including placing the support member on two handles engageable by the gripper of a loading machine, each of the handles being attached to a respective one of the two fuel assemblies.

3. Method according to claim 2 including guiding the two fuel assemblies along edges of the respective duct tubes thereof disposed opposite one another in direction of the mesh diagonal by means of a device associated with the support member.

4. Method according to claim 1 wherein the support member is rigid, and prior to the withdrawal of the respective control rod, two of the fuel assemblies of the group thereof are unloaded from the nuclear reactor, guiding the two fuel assemblies remaining in the nuclear reactor along edges of the respective duct tubes thereof disposed opposite one another in direction of one of the mesh diagonals by means of a device associated with the support member, and placing the support member on webs of the transverse support grid, likewise prior to withdrawing the control rod, the support member being disposed in the other of the mesh diagonals and, with centering members, engaging respective corners of the mesh lying in the other mesh diagonal.

5. Method according to claim 1 including gripping, by means of a gripper of a loading machine, a handle attached to the support member.

6. Support member for a nuclear reactor wherein control rods of cruciform cross section are at least partly withdrawn, each of the control rods being associated with a respective group of four fuel assemblies respectively having elongated duct tubes of rectangular cross section and being disposed in respective corners of a rectangular mesh of a transverse support grid, the ducts forming therebetween a gap-shaped intermediate space of cruciform cross section for accommodating a respective one of the control rods of cruciform cross section, one of the fuel assemblies of the respective group of four fuel assemblies being removed from the respective mesh, and the support member being received in the respective mesh so as to fix in the respective corners of the mesh the ends of two diagonally opposed fuel assemblies of the group of fuel assemblies remaining in the respective mesh, the support member comprising a rigid web having at respective ends thereof a respective centering box, formed with a centering hole for receiving therein a respective handle of one of the two diagonally opposed fuel assemblies.

7. Support member according to claim 6 wherein the respective centering holes of said centering boxes are formed as elongated slots disposed transversely to said web.

8. Support member according to the method of claim 4 comprising a rigid web having attached at respective ends thereof a respective centering part for engaging in a mesh of the transverse support grid, and having formed at said ends thereof respective bearing surfaces associated with the transverse support grid.

9. Support member according to claim 6 including a device for guiding the two fuel assemblies along edges of the respective duct tubes thereof disposed opposite one another in direction of the mesh diagonal, said guiding device comprising rails disposed on said rigid web between said two centering boxes and forming, with said centering holes of said centering boxes, similarly directed guide channels for said edges of said duct tubes and for spring elements located thereat, respectively.

10. Support members according to claim 8 including a device for guiding the two fuel assemblies along edges of the respective duct tubes thereof disposed opposite one another in direction of the mesh diagonal, said guiding device comprising rails disposed on said rigid web between said two centering parts and forming, with said centering holes of said centering parts, similarly directed guide channels for said edges of said duct tubes and for spring elements located thereat, respectively.

11. Support member according to claim 6 including a handle accommodated to a gripper of a loading machine and located between said two centering boxes on said web.

12. Support member according to claim 8 including a handle accommodated to a gripper of a loading machine and located between said two centering parts on said web.

13. Support member according to claim 6 or 8 including a supporting part secured laterally to said web for laterally supporting a respective duct tube of one of the fuel assemblies.

14. Support member according to claim 8 including flat crosspieces located at the ends of said web and forming bearing surfaces associated with said transverse support grid.

15. Support member according to claim 14 wherein one of said flat crosspieces has a square contour with a diagonal thereof aligned with said web and located at one end of said web, and the other of said flat crosspieces is strip-shaped, extends flatly and transversely to said web and is located at the other end of said web, spaced therefrom.

16. Support member according to claim 6 wherein each of said centering holes merges into respective mutually parallel guide sleeves aligned with said centering holes and open at both ends thereof, and including a respective supporting pin loosely guided in each of said guide sleeves and in the respective centering holes associated therewith, each of said supporting pins having an end facing away from the respective centering hole associated therewith and supporting a respective different end of a balance beam mounted on said rigid web between said mutually parallel guide sleeves, said balance beam being pivotable about an axis of rotation disposed perpendicularly to a plane defined by the longitudinal directions of said guide sleeves and said supporting pins, respectively.

17. Support member according to claim 16, wherein said supporting pins have hemispherically rounded ends projecting out of said guide sleeves and facing away from the respective centering holes, said supporting pins loosely supporting said balance beam.

18. Support member according to claim 17 including a respective collar formed on said supporting pins between the location thereof on which said balancing beam is supported and the respective guide sleeve associated with said supporting pins, respectively, said collar having a diameter greater than the inner diameter of the respective guide sleeve.

19. Support member according to claim 16 wherein said supporting pins are of equal length, and said axis of rotation of said balancing beam is located in the middle between said guide sleeves.

20. Support member according to claim 19 wherein said balance beam is rectilinear.

21. Support member according to claim 6 or 8 wherein said duct tubes have a square cross section, and said mesh is square.

* * * * *